Oct. 7, 1947.　　　W. MASSIERER　　　2,428,375
SPECIAL PURPOSE CHUCK
Filed May 15, 1945

Inventor
WALTER MASSIERER
By C. E. Herrstrom & H. E. Thibodeau
Attorneys

Patented Oct. 7, 1947

2,428,375

UNITED STATES PATENT OFFICE 2,428,375

SPECIAL PURPOSE CHUCK

Walter Massierer, Philadelphia, Pa.

Application May 15, 1945, Serial No. 593,912

1 Claim. (Cl. 51—217)

(Granted under the act of March 3, 1883, as amended April 30, 1928; 370 O. G. 757)

The invention described herein may be manufactured and used by or for the Government for governmental purposes, without the payment to me of any royalty thereon.

My invention relates to devices for holding objects during performance of grinding and polishing operations thereon and it has special reference to holding fixtures for glass lenses and other equivalent blanks that are to be acted upon by optical curve generators or other abrading machines.

Broadly stated, the object of my invention is to improve the design and extend the usefulness of optical blank holders of the type just named.

A more specific object is to make such holders adjustable and thereby enable them to receive blanks of varying diameters and thicknesses.

Another object is to incorporate mechanical ruggedness, ease of adjustment, and ease of assembly and disassembly into holders of the type here considered.

A further object is to assure positive transmission of turning movement from the holder to the blank.

A still further object is to enable close curvature accuracy to be maintained during grinding.

In practicing my invention I attain the foregoing and other objects and advantages by providing an "adjustable chuck" form of holding fixture that has the unique construction and the superior performance presently to be described. One preferred design for such a fixture is shown by the accompanying drawing wherein.

Figure 1:
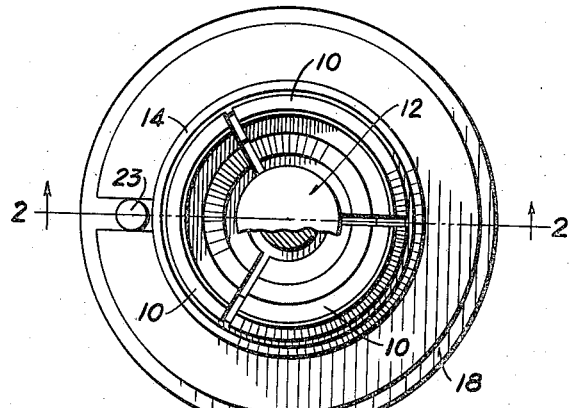
Fig. 1 is a top plan view of the new chuck.
Figure 2:
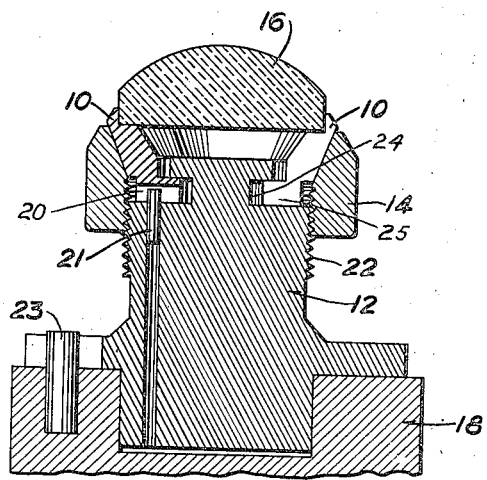
Fig. 2 is a section on line 2—2 of Fig. 1 showing the chuck with an optical lens blank held therein.

The improved adjustable chuck which these drawings illustratively show will be seen from Figs. 1-2 to comprise three radially movable jaws 10 arranged as segments; a central adapter body or hub 12 supporting and imparting rotation to these jaws; and a collar 14 which encircles both the jaws and the hub and positions the jaws radially.

Also represented by Fig. 2 are a glass blank 16 held in position in the chuck (for rotation with adapter 12) plus the lower spindle 18 (also shown by Fig. 1) of an optical grinding machine (not shown) of "curve generator" or other conventional type.

Such a machine is additionally provided with an upper spindle or grinding head (also not shown) which carries a "diamond" or other abrading tool positionable in contact with the upper surface of blank 16 and independently rotated by the upper spindle shaft. By shifting the grinding head tool along the arc of a circle that encompasses the lens blank, the desired optical curvature may be ground or "generated" on the surface of blank 16.

Heretofore optical blanks of each different diameter have required an individual holder which accurately matches that diameter; moreover, it has been customary to allow the blank to rest loosely in the holder and to receive rotative motion solely from frictional contact with the holder. Since optical blanks to be ground typically have a wide variety of different diameters, the number of conventional holders which must be provided often becomes objectionably large. Transfer of turning movement from the holder to the blank through frictional engagement only is, moreover, not always sufficiently positive to prevent slippage. Still further, the looseness of the blank's fit detracts from accuracy and objectionably alters the curvature.

The improved "adjustable chuck" type of holder here disclosed overcomes all of these difficulties and affords additional advantages presently to be made evident.

Figure 3:
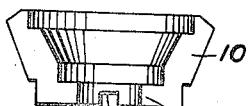
Fig. 3 represents one of the chuck's three segmental jaws as viewed from its inner side.

The segments or jaws 10 of this chuck may satisfactorily be made of brass or other equivalent metal, and either a greater or lesser number than the represented three may be used. Each preferably is shaped as best indicated by Fig. 3. The upstanding gripping edges at the tops of these jaws are shown as being internally arced to mate with the circumference of the average diameter blank 16 to be received by the chuck.

A shoulder at the base of each jaw's upstanding gripping edge supports the under side of blank 16 as indicated by Fig. 2; a slot 20 in each jaw's underside fits over a torque transmitting pin 21 protruding from the upper face of adapter hub 12 (again see Fig. 2); and the outside of each jaw is tapered as shown by Figs. 2-3 for mating contact with the internally tapered chuck adjusting sleeve 14.

This adjusting sleeve 14 also may satisfactorily be made of brass or other equivalent metal. Its upper interior is tapered as represented, while its lower interior carries threads 22 on the outside of adapter body 12. The outside of this sleeve may be knurled (not shown) to facilitate rotation by an operator.

Turning of the sleeve with respect to the hub raises or lowers the sleeve on the adapter, depending upon the turning direction, and thereby either wedges all three jaws 10 inwardly towards the adapter hub's center or allows those jaws to be moved outwardly away from the center. The direction of threads 22 is such that grinding torque exerted on blank 16 tends to tighten rather than loosen wedging action by sleeve 14 on jaws 10.

When screwed down to its lowermost position, moreover, the top of the sleeve clears the bottom of the jaws and permits complete withdrawal thereof from the adapter body. This makes assembly and disassembly of the chuck very easy.

This adapter body or hub 12 may satisfactorily be made of steel or other equivalent metal. Preferably it is designed for removable fit into a matingly shaped recess in the grinding machine's lower spindle 18. Reception of rotative motion from the spindle may be effected in any suitable manner, as through a pin 23 carried by the spindle and fitting into a mating slot in the lower flange of the hub body.

The upper portion of adapter 12 is provided with the circumferential groove which Fig. 2 represents as accommodating lower mating lips on the three segmental jaws 10. Preferably the axial width of the groove is only slightly greater than the jaw lip thickness; freedom for radial movement of the jaws is, however, maintained in order that adjustability of the complete chuck may easily and readily be effected.

Other equivalent construction for the hub-like adapter body 12 may, of course, be substituted. One of these contemplates making the extreme upper portion of the body as a washer that is spacedly secured to the adapter's lower portion by a central pin (not shown); another contemplates making the threaded part 22 and the grooved metal thereabove as a piece separate from the lower base of the adapter but secured thereto by a central rod-like extension (not shown) projected down into the base.

The torque transmitting pins 21, earlier mentioned as interconnecting the jaws with the represented hub 12, in no way impair the chuck's adjustability, since the jaw slot 20 (see Fig. 3) that engages each pin allows free radial sliding of the jaw 10 over the pin. Other equivalent expedients for transmitting torque while allowing radial shifting of the jaws are, of course, useable.

From the foregoing description of component parts the manner in which the complete chuck functions will now have become apparent. Screwing of the adjusting collar 14 upwardly on the threads 22 of the adapter radially wedges all three jaws 10 inwardly; screwing of the collar downwardly on the adapter frees all of those jaws for outward radial movement away from the chuck's center.

In the illustrative construction shown, the range of such radial movement on the part of each jaw 10 is slightly less than one eighth inch. This gives a total diametrical adjustment range of about three-sixteenths of an inch. The chuck illustrated (drawings are to slightly reduced scale) is, therefore, capable of receiving optical blanks 16 whose diameters vary within the named range. In curvature the jaw faces preferably match the diameter that is represented by a mid positioning of the jaws.

To insert a blank 16 into the chuck it is only necessary to release and spread the jaws beyond that blank's diameter, place the blank between the jaws as shown in Fig. 2, and then wedge the jaws thereagainst by screwing collar 14 upwardly. The resulting engagement holds the blank firmly and accurately in the chuck and allows curvature grinding operations to be very accurately performed thereon without slippage or misalignment. Removal from the chuck is effected by screwing the collar 14 downwardly to allow movement of jaws 10 outwardly away from the blank.

The named positive securing of the blank in the chuck assures maximum curvature accuracy during grinding and it further imparts desirable resistance against tilting or tipping and thereby extends the thickness of blanks which are grindable in abrading machines of curve generator and other types. By reason, moreover, of the mechanical ruggedness of my improved chuck long life and high reliability are at once assured.

Although I have described my adjustable chuck improvements by reference to devices for rotating optical blanks during grinding or polishing, it will be apparent that such reference is illustrative rather than restrictive and that holding fixtures for other uses also may be benefited.

It will accordingly be seen that I have improved the design and extended the usefulness of chuck-type holding devices when considered generally; that I have imparted ready adjustability to such holding fixtures and have enabled them to receive optical or other blanks of varying diameters and thicknesses; that I have incorporated mechanical ruggedness, ease of adjustment and ease of assembly and disassembly into such holders; that I have assured positive transmission of turning movement from the holder to the blank; and that I have enabled close curvature accuracy to be maintained during grinding.

My inventive improvements are therefore extensive in their adaption and are not to be restricted to the specific form here disclosed by way of illustration.

I claim:

In an adjustable chuck for holding optical blanks, the combination of a hub-like adapter comprising a base portion for attachment to a spindle shaft plus an end portion which has a circumferential groove extending radially thereinto and which has external threads between that groove and said base portion, a plurality of jaws spacedly placed around said adapter's end and having inwardly protruding lower base lips which fit into and are slidably engaged by said radial groove and each jaw further having a slot that radially extends through the entire underside of the jaw, a member carried by said adapter beneath each jaw and protruding upwardly from the adapter for radially slidable engagement by the said slot in that jaw to thereby restrain the jaw from rotative movement with respect to said adapter without interfering with radial movement by the jaw, each of said jaws further having an upper flat peripheral seating surface perimetrically bounded by a mutually coactive inner gripping face spaced axially from said adapter's end and an outer wedging face which tapers outwardly from the jaw's base to the jaw's gripping edge, and a chuck adjusting sleeve encircling the adapter's end portion and said jaws and having a tapered upper interior which mates with and bears against said outer jaw wedging faces, said sleeve also having threads at its lower interior which mate with and turnably engage said adapter's external threads.

WALTER MASSIERER.

REFERENCES CITED

The following references are of record in the file of this patent:

UNITED STATES PATENTS

| Number | Name | Date |
|---|---|---|
| 1,436,626 | Spaander | Nov. 21, 1922 |
| 1,683,712 | Clark | Sept. 11, 1928 |
| 892,927 | Bemis | July 7, 1908 |
| 1,202,013 | Ainsley | Oct. 24, 1916 |
| 1,296,050 | Cossman | Mar. 4, 1919 |

FOREIGN PATENTS

| Number | Country | Date |
|---|---|---|
| 22,842 | Great Britain | Oct. 24, 1904 |